United States Patent Office 3,560,134
Patented Feb. 2, 1971

3,560,134
AZO, VAT AND FLUORESCENT DYES DUST-PROOFED WITH A LIGHT MINERAL OIL AND A FATTY ACID OF POLYOXYALKYLATED SORBITAN
Clemens Streck, Loudonville, N.Y., assignor to
GAF Corporation
No Drawing. Filed June 19, 1967, Ser. No. 647,203
Int. Cl. C09b 67/00
U.S. Cl. 8—34　　　　　　　　　　　　　4 Claims

ABSTRACT OF THE DISCLOSURE

A dustproofing formulation comprising a mixture of a low viscosity mineral oil and a polyoxyalkylated sorbitan ester of a long chain fatty acid, the dustproofing formulations being suitable for use in dustproofing of powders contemplated for use with coloring agents which are acceptable for use in cosmetics and foodstuffs, or wrapping materials which may come in contact with foodstuffs and cosmetics.

BACKGROUND OF THE INVENTION

Field of the invention

This invention relates to a dustproofing formulation and methods for its use in dustproofing powders which have a strong tendency to dust, particularly powders which are acceptable as coloring agents for use in cosmetics and foodstuffs or materials which may come in contact with cosmetics and foodstuffs. The invention also relates to compositions comprising the dustproofing formulation and coloring agents to be dustproofed. Powders which may be dustproofed using the novel formulation of this invention include dyes, brightening agents, surfactants and the like.

Description of the prior art

It is known in the prior art to prevent dusting of materials, which are subject to dusting, by the addition thereto of dustproofing ingredients such as humectant substances, hydrocarbon oils and mineral oil. In fact, it has become common practice to dustproof materials which are to be employed in foodstuffs or cosmetics or in the wrapping materials therefor, with mineral oil. However, the use of mineral oil in this regard has suffered from the disadvantage that the solutions produced from such formulations become turbid and therefore unsatisfactory, particularly where the dyes employed are light colored such as yellows and with brightening agents. Therefore, no procedure is presently available to the prior art which provides suitable formulations and methods for dustproofing dyes, brightening agents, surfactants and the like which are to be employed in association with cosmetics and foodstuffs.

SUMMARY OF THE INVENTION

It is accordingly one object of the present invention to provide a dustproofing formulation which overcomes or otherwise mitigates the problems incurred by similar formulations in the prior art.

A further object of the present invention is to provide a suitable dustproofing formulation, which comprises a mixture of a low viscosity mineral oil and a polyoxyalkylated sorbitan ester of a long chain fatty acid, as well as methods for use of the formulation.

A still further object of the present invention is to provide a novel dustproofing formulation comprising a mixture of a low viscosity mineral oil and a polyoxyalkylated sorbitan ester of a long chain fatty acid, which formulation is suitable for use in forming dustproofed compositions with powders comprising dyes, brightening agents, surfactants and the like, particularly those coloring agents adapted for use in association with foodstuffs and cosmetics.

Other objects and advantages of the present invention will become obvious to those skilled in the art as the description thereof proceeds.

In satisfaction of the foregoing objects and advantages, there is provided by this invention a dustproofing formulation comprising 50 to 95 parts of a low viscosity mineral oil mixed with 5 to 50 parts of a polyoxyalkylated sorbitan ester of a long chain fatty acid, the dustproofing formulation being suitable for dustproofing of powdered coloring agents, such as dyes, brightening agents, surfactants and the like which are suitable and acceptable for use with cosmetics and food stuffs. Also provided by this invention are compositions of matter comprising the novel dustproofing formulations in combination with the coloring agents.

DESCRIPTION OF PREFERRED EMBODIMENTS

As pointed out hereinabove, the formulation of this invention comprises a low viscosity mineral oil mixed with a polyoxyalkylated sorbitan ester of a long chain fatty acid. This dustproofing formulation, while novel per se, has been found to be especially useful in the dustproofing of powders which comprise dyes, brightening agents, surfactants and the like and particularly useful in dustproofing of coloring agents in the form of powders which are adapted for use in association with cosmetics and foodstuffs and paper goods or other wrapping materials which may come in contact with cosmetics and foodstuffs.

In regard to the fact that the novel formulation has been found suitable for dustproofing powders which are coloring agents for use in foods and cosmetics and wrapping materials therefor, it is to be appreciated that both highly refined mineral oil and polyoxyalkylated sorbitan esters of long chain fatty acids are both recognized as meeting the requirements of Food and Drug Administration Regulation 121–2589(b) for use by humans and it is therefore apparent that a mixture of these materials in the proportions contemplated, when used to dustproof food, drug and cosmetic coloring materials, results in a product which will also meet the noted regulation of the Food and Drug Administration and thus can be safely used with cosmetics and foodstuffs and paper goods or other wrapping materials designed to come in contact with such cosmetics and foodstuffs.

According to the present invention, it has been found that the mixture of materials in the novel formulation is particularly satisfactory in achieving the dustproofing effect in the case of light colors, such as yellows and brightening agents, in that the addition of the polyoxyalkylated sorbitan ester of the long chain fatty acid apparently acts as a dispersing agent for the mineral oil and produces an aqueous dispersion which is not turbid, thereby obviating the disadvantages of the prior art wherein mineral oil per se had been employed to dustproof coloring compounds.

The mineral oil to be employed in the formulation of the present invention is of course well known in the art and can generally be described as a low viscosity mineral oil. Suitable mineral oils having the required viscosity are those sold commercially under the trade name "Marcols" and have viscosities in the range of about 40 to 80 Saybolt seconds at 100° F.

The polyoxyalkylated sorbitan esters of long chain aliphatic acids may be generally described as comprising the esters of fatty acids having 8 to 18 carbon atoms such as decoic acid, octanoic acid, lauric acids, myristic acid, palmitic acid, stearic acid, oleic acid, ricinoleic acid, and the like with sorbitan, the resulting ester thereafter being reacted with about 5 to 30 moles of alkylene oxide, such as ethylene oxide, propylene oxide, etc., the ester resulting from reaction with the ethylene oxide being preferred. The esters are for the most part esters of sorbitan with one or three moles of fatty acid and are preferably liquid although if they are solids and are dispersed readily in the mineral oil, they are usable in the formulation of the present invention.

Listed hereinbelow are a number of polyoxyalkylated fatty acid esters of sorbitan which have been found suitable for use in the present invention and which represent preferred esters for use in the invention. These materials are as follows:

Sorbitan monolaurate which contains 20 moles of ethylenexide

Sorbitan monoleate which contains 20 moles of ethylene oxide

Sorbitan monoleate which contains 5 moles of ethylene oxide

Sorbitan monopalmitate which contains 20 moles of ethylene oxide

Sorbitan monostearate which contains 20 moles of ethylene oxide

Sorbitan trioleate which contains 20 moles of ethylene oxide.

A preferred polyoxyalkylated sorbitan ester which is available commercially and may be used to advantage in the formulation of the present invention are the esters sold commercially under the trade name "Glycosperse."

As pointed out hereinabove, the dustproofing formulation of this invention comprises about 50 to 95 parts of the low viscosity mineral oil mixed with about 5 to 50 parts of the polyoxyalkylated sorbitan ester of a long chain fatty acil as it has been found that these proportions of the ingredients provide optimum results for the dustproofing formulation of this invention.

The formulation is generally suitable for dustproofing any powders which may be employed as coloring materials and particularly suitable for dustproofing powders used as coloring agents in cosmetics and foodstuffs or wrapping materials for use therewith and particularly those which have been approved by the Food and Drug Administration for such uses under the regulations noted above. In particular, it has been found that the formulation of this invention may be used to dustproof powders comprising dyes, such as vat and azo dyes, brightening agents, surfactants, etc., and particularly those materials which are light in color such as the yellow colorants and the brightening agents. However, the formulation is not to be considered as limited thereto as it may be beneficially utilized where dustproofing of powders is desired.

The procedure for dustproofing the powders which are to be dustproofed comprises mixing about 0.5% to about 5.0% of the above described dustproofing formulation with about 100 parts of the product to be dustproofed. This is accomplished preferably by merely mixing the liquid dustproofing formulation with the dry powder which is to be dustproofed or, alternatively, by mixing with a paste of the product which is to be dustproofed and thereafter dried as either procedure has been found to be satisfactory.

The invention is further illustrated by the following examples although it is to be understood that the examples are not to be considered as limited on the scope of the invention.

EXAMPLE 1

A dustproofing formulation was prepared by agitating 20 parts of sorbitan monolaurate containing 20 moles of ethylene oxide with 80 parts of a low viscosity mineral oil sold under the trade name of Marcol 62. Thereafter, 2 parts of this formulation was mixed well with 98 parts of Brilliant Pure Yellow 6G Conc (C.I. 47035) which did not contain any other dustproofing agent. The dustproofed product has excellent non-dusting properties in contrast to the untreated product. The dustproofed product was suitable for dyeing paper by the beater or other method, which paper can be used in contact with foodstuffs.

EXAMPLES 2 TO 8

The following dustproofing formulations were prepared in the indicated proportions:

|  | 2 | 3 | 4 | 5 | 6 | 7 | 8 |
|---|---|---|---|---|---|---|---|
| Sorbitan monolaurate containing 20 moles of ethylene oxide | 40 | 10 |  |  |  | 20 | 20 |
| Sorbitan monoleate containing 20 moles of ethylene oxide |  |  |  | 20 |  |  |  |
| Sorbitan monoleate containing 5 moles of ethylene oxide |  |  | 20 |  | 20 |  |  |
| Marcol 52 (viscosity: 51 Saybolt seconds at 100° F.) | 60 | 90 | 80 | 80 | 80 |  |  |
| Marcol 62 (viscosity: 61 Saybolt seconds at 100° F.) |  |  |  |  |  | 80 |  |
| Marcol 72 (viscosity: 71 Saybolt seconds at 100° F.) |  |  |  |  |  |  | 80 |

The Marcols are low viscosity mineral oils sold under that trade name.

Two parts of each of these formulations were then mixed with 100 parts of non-dustproofed Brilliant Pure Yellow 6G Conc. In all cases the product showed good non-dusting properties as compared with the untreated product.

EXAMPLES 9 TO 22

The formulation prepared in Example 1 was mixed well with the following dyes in 2% concentration based on 2 parts of the dustproofing formulation to 98 parts of the dye powder:

9 Naphthylamine Black 10BR (C.I. 20470)
10 Tartrazine CX extra (C.I. 19140)
11 Brilliant Crocein 3BA (C.I. 27290)
12 Stilbene Yellow TP (C.I. 40000)
13 Fastusol Yellow RP (C.I. Direct Yellow 84)
14 Fast Light Green G (C.I. 42046)
15 Ponceau SX (C.I. 14700)
16 Fast Light Orange G (C.I. 16230)
17 Acid Violet 6B (C.I. 42640)
18 Azo Fuchsine 6B (C.I. 17200)
19 Alizarine Saphirol B (C.I. 63010)
20 Metanil Yellow (C.I. 13065)
21 Alizarine Astrol B (C.I. 61530)
22 Eosine YB (C.I. 61530)

In all cases the resulting mixtures exhibited improved non-dusting properties.

EXAMPLES 23 TO 25

The anti-dust formulation prepared as in Example 1 was mixed well with the following brightening agents by using 2 parts of the anti-dust formulation to 98 parts of the brightening agent:

23 Blancophor SB
24 Blancophor SV
25 Blancophor RG

These Blancophors are brightening agents sold under that trade name and are of the diaminostilbene disulfonic acid-cyanuric chloride type.

In all cases the products showed improved dusting properties as compared with the untreated brightening agent.

EXAMPLES 26 TO 29

The anti-dust formulation of Example 1 was mixed well with the following surfactants in 2% strength.

26 Igepon AC-78
27 Igepon AP-78
28 Igepon TN-74
29 Leonil SA

The above named surfactants are sold under the tradenames shown. Igepon AC-78 and Igepon AP-78 are long chain fatty acid (coconut acid and oleic acid, respectively) esters of sodium isethionate. Igepon TN-74 is a long chain fatty acid (palmitic) amide of sodium-N- methyltaurate and Leonil SA is a naphthalenesulfonic acid derivative.

In all cases the dusting properties of the pulverulent surfactants were greatly improved.

While the present invention has been described and illustrated with certain specific embodiments, it will be apparent to those skilled in the art to which the invention pertains that other embodiments as well as modifications thereof may be made without departing in any way from the spirit and scope of the invention for the limits of which reference must be had to the appended claims.

What is claimed is:

1. As a composition of matter, a dustproofed powdered coloring agent consisting essentially of, (a) a powdered dye or brightening agent and (b) a dustproofing formulation consisting essentially of about 50 to 95 parts of a low viscosity mineral oil mixed with about 5 to 50 parts of a polyoxyalkylated sorbitan ester of a long chain fatty acid, wherein said composition of matter consists essentially of about 0.5 to 5.0 parts of dustproofing formulation per 100 parts of coloring agent.

2. A composition of matter according to claim 1 wherein the polyoxyalkylated sorbitan ester is a sorbitan ester of a long chain fatty acid having 8 to 18 carbon atoms, the ester having been further reacted with about 5 to 30 moles of ethylene oxide.

3. A composition of matter according to claim 2 wherein the polyoxyalkylated sorbitan ester is selected from the group consisting of sorbitan monolaureate containing 20 moles of ethylene oxide; sorbitan monoleate containing 20 moles of ethylene oxide; sorbitan monoleate containing 5 moles of ethylene oxide; sorbitan monopalmitate containing 20 moles of ethylene oxide; sorbitan monostearate containing 20 moles of ethylene oxide; and sorbitan trioleate containing 20 moles of ethylene oxide.

4. A composition according to claim 3 wherein the coloring agent is selected from the group consisting of vat dyes, azo dyes, and brightening agents.

References Cited

UNITED STATES PATENTS

| | | | |
|---|---|---|---|
| 2,828,180 | 3/1958 | Sertorio | 8—34 |
| 2,617,754 | 11/1952 | Neely | 424—63 |
| 2,486,562 | 11/1949 | Iamarino | 8—79(AD) |

OTHER REFERENCES

Atlas Powder Co., "A Guide to Cosmetic & Pharmaceutical Formulation with Atlas Products," pp. 18–21, 29, 30, 31, 43, 50 and 56. Pub. by Atlas Powder Co., Wilmington, Del. 1954.

DONALD LEVY, Primary Examiner

U.S. Cl. X.R.

8—1, 41, 79, 93, 94; 99—48; 252—301.2; 424—63